(12) United States Patent
Hellsten et al.

(10) Patent No.: US 6,441,772 B1
(45) Date of Patent: Aug. 27, 2002

(54) SAR RADAR SYSTEM

(75) Inventors: Hans Hellsten; Lars Ulander, both of Linköping (SE)

(73) Assignee: Totalförsvarets Forskningsinstitut, Stockholm (SE)

( * ) Notice: Subject to any disclaimer, the term of this patent is extended or adjusted under 35 U.S.C. 154(b) by 0 days.

(21) Appl. No.: 09/857,172

(22) PCT Filed: Dec. 17, 1999

(86) PCT No.: PCT/SE99/02424
§ 371 (c)(1),
(2), (4) Date: Jun. 18, 2001

(87) PCT Pub. No.: WO00/37965
PCT Pub. Date: Jun. 29, 2000

(30) Foreign Application Priority Data

Dec. 18, 1998 (SE) ............................................. 9804417

(51) Int. Cl.[7] ............................................. G01S 13/90
(52) U.S. Cl. .......................... 342/25; 342/190; 342/195
(58) Field of Search ........................ 342/25, 190, 191, 342/192, 193, 194, 195, 196

(56) References Cited

U.S. PATENT DOCUMENTS

| | | | |
|---|---|---|---|
| 4,866,446 A | 9/1989 | Hellsten | 342/25 |
| 4,965,582 A | 10/1990 | Hellsten | 342/25 |
| 5,122,803 A | 6/1992 | Stann et al. | 342/25 |
| 5,675,550 A | * 10/1997 | Ekhaus | 367/7 |
| 5,708,436 A | * 1/1998 | Loiz et al. | 342/25 |
| 5,805,098 A | * 9/1998 | McCorkle | 342/25 |
| 5,818,383 A | 10/1998 | Stockburger et al. | 342/109 |
| 5,969,662 A | * 10/1999 | Hellsten | 342/25 |

FOREIGN PATENT DOCUMENTS

| | | |
|---|---|---|
| SE | 9503275 | 9/1995 |
| SE | 9601199 | 3/1996 |
| SE | 9702331 | 6/1997 |
| WO | 97/11387 | 3/1997 |
| WO | WO9711387 A1 * | 3/1997 |
| WO | 97/36188 | 10/1997 |
| WO | 95/58275 | 12/1998 |

* cited by examiner

Primary Examiner—John B. Sotomayor
(74) Attorney, Agent, or Firm—Jacobson Holman, PLLC

(57) ABSTRACT

The present invention relates to a radar system which comprises a platform which moves over a number of objects. The number of objects can be very large and the objects can appear in the form of, for example, a ground surface. The platform supports radar equipment which reproduces the objects by means of synthetic aperture technique (SAR) via at least one antenna without requirements as to directivity or fractional bandwidth. Moreover, the movement of the platform is, during the recording of data for a SAR image, essentially rectilinear and uniform. The invention is characterized mainly in that it comprises a signal-processing device which records received radar echoes from each transmitted radar pulse and records or calculates the position of the used antenna or antennae, and which calculates a one-parameter quantity of two-dimensional SAR images as a function of two image co-ordinates where the parameter is the relative speed. Here use is made of the fact that each object, i.e. a radar echo with certain image co-ordinates, is reproduced at a maximum ratio of desired to undesired signal for a predetermined value of the relative speed parameter, which value is established to be the magnitude of the relative velocity vector between the object and the platform. In the calculation, the signal-processing device backprojects radar raw data in a hierarchical scheme, where each level is based only on the immediately preceding one, and where the summation of radar raw data occurs in the form of subapertures having a gradually increasing length.

14 Claims, 2 Drawing Sheets

SAR RADAR SYSTEM

BACKGROUND OF THE INVENTION

1. Field of the Invention

The present invention relates to a SAR radar system. The system permits detection of moving objects by means of a low-frequency radar with synthetic aperture (SAR). An important application is detection of moving objects concealed in forest vegetation from an airborne platform. In such a situation, both optical, infrared and microwave radiation are blocked to such an extent that it is not possible to carry out such detection.

2. Description of the Related Art

SAR is a known technique for two-dimensional high-resolution ground mapping. A platform, such as an aircraft or satellite, moves along a nominal straight path and illuminates a large ground area by means of an antenna. Short pulses, or alternatively long coded signals filtered by using pulse compression technique, are transmitted from the antenna and the return signal from the ground is received by the antenna and recorded along the straight path. By signal processing, high resolution is accomplished both along and transversely of the straight path. A condition for this is that the position of the antenna is known or can be calculated within a fraction of the wavelength and that the relative amplitude and phase of the transmitted and received radar signal are known. Moreover, the ground has to be invariable as the aircraft passes. The optimum geometric resolution that can be provided with SAR is determined by centre frequency and bandwidth of the transmitted signal and the aperture angle, over which the ground area is illuminated by the antenna, along the straight path.

The SAR technique has been applied in a very wide frequency range, about 20 MHz–100 GHz which corresponds to wavelengths of 3 mm–15 m. The choice of frequency determines largely which ground secures are to be reproduced since the backscattered return signal is affected above all by structures whose extent is of the wavelength size. Moreover, primarily the wavelength determines the capability of penetrating various ground layers, i.e. the penetration of the wave increases with a decreasing frequency. In connection with, for instance, vegetation, the attenuation is small for frequencies below 100 MHz and great for frequencies above 1 GHz. Thus the capability of penetrating vegetation decreases gradually with an increasing frequency, and a practical limit for detecting objects concealed in vegetation therefore is about 1 GHz. SAR systems which operate below and above 1 GHz, respectively, are in the following referred to as low-frequency and high-frequency systems, respectively.

Swedish Patent 8406007-8 (456,117) and the corresponding PCT Application SE85/00490 resulting in, inter alia, U.S. Pat. Nos. 4,866,446 and 4,965,582, and Swedish Patent Application 9503275-1 and the corresponding PCT Application SE96/01164, which are herewith incorporated by reference, disclose embodiments of low-frequency two-dimensional broadband SAR imaging.

Static objects in forest terrain can be detected with low-frequency SAR, i.e. with a wavelength in the range 0.3–15 m. The low frequencies have the property of penetrating the vegetation layer with little attenuation and only causing a weak back-scattering from the coarse structures of the trees. Thus, static objects, such as stationary vehicles, can be detected also in thick forest by combining low frequencies with SAR technique which gives resolution of wavelength size. This has been scientifically demonstrated in a plurality of experiments in recent years.

As described above, low-frequency SAR cannot detect objects that are moving. The high resolution of SAR arises by the imaging process using signals for a long time of integration. To enable sufficiently high resolution for detection, the radar must observe the object along a path which is of the same order as the distance to the object. This distance can be 20 km, i.e. for typical flying speeds the time of integration is about 100 s. During this time, an object must therefore be static within a fraction of the wavelength, i.e. the fraction of one meter. This fact makes is impossible in practice to detect moving camouflaged objects by using this technique. As a matter of fact, the speed of an object must be less than about 0.1 m/s for the object to be considered stationary.

It is a well-known fact that high-frequency SAR technique can be modified to detect and reproduce moving objects by using an array of narrow-lobe antennae. By arranging the antennae so that the antenna lobes are displaced in parallel it is possible by using signal processing to essentially eliminate all influence on the radar signal deriving from stationary objects. This GMTI function (ground moving target indication) can be implemented essentially in two different ways.

The first method is called DPCA (displaced phase centre antenna), which is used to eliminate stationary objects from the signals from two parallel-displaced antenna elements. This method utilises the fact that the signal, from all stationary objects, in the front and rear element, respectively, is repeated after a time interval in conformity with the platform moving the same distance as the element distance. After a delay, the signals from the stationary objects can thus be eliminated by subtraction. The drawback of this method is that it requires a calibrated and time-invariant radar system. A further problem with DPCA is that blind speeds arise, for which also moving objects are perceived to be stationary. The reason for this is that extinction also occurs when the phase change between the signals is a multiple of $2\pi$. In practice this involves a demand for maximum antenna separation, which thus affects the detectable minimum radial speed.

The second method is called STAP (space-time-adaptive filtering) and is based on the covariance properties of the time signals for the different elements in the array antenna. The covariance matrix for stationary and moving objects, respectively, is different which is used by linearly combining signals in time and space so that a maximum ratio of desired to undesired signal is obtained. In practice, the co-variance matrix is estimated by taking random samples of the undesired signal, which together with a model of the desired signal forms an adaptive signal-adjusted space-time filter. The STAP technique is not restricted to the elimination of stationary objects as is the DPCA technique. Essentially all forms of undesired signal can be processed in the same manner provided that the covariance matrix can be estimated and that it differs from the desired signal. For example, also intentional or unintentional interference signals can be eliminated by the same method.

BRIEF SUMMARY OF THE INVENTION

The basic question—which the present invention intends to solve—is how to combine the technique of low-frequency SAR and the technique of detection of moving objects (GMTI) to produce signals which penetrate forest vegetation and at the same time permit detection of moving objects. The problem is especially the practical difficulty of providing on an airborne platform a sufficiently large radar antenna at low frequencies which has the same high directivity as a high-frequency narrow-lobe radar antenna so that the described methods for high-frequency SAR having the GMTI function can be used. The restricted physical space on board such a platform means essentially that low-frequency radar antennae are omnidirectional and have a low directly. The absence of directivity has two important consequences for a low-frequency SAR having the GMTI function, which mean that prior-art methods cannot be used.

First, the absence of directivity means a considerable problem of providing optimum performance for the GMTI function. The latter in fact requires that the directional sensitivity of the elements be as equal as possible, which is difficult to achieve if the directivity is low. The reason is that the antenna elements connect electromagnetically to the platform and thus the directional sensitivity changes. Consequently, the directional sensitivity is changed according to the exact position of the antenna element on the platform, the antenna elements having different direction properties which make the above-mentioned GMTI methods inefficient For this reason, the present invention introduces a solution in which the antenna elements are mounted in a translation-invariant and symmetric configuration in front of the platform.

Second, the absence of directivity means that a high signal sensitivity and geometric resolution require optimal coherent signal processing of radar data for a long time of integration. The signal integration corresponds to the object being illuminated over a large aperture angle. The aperture angle is de facto so large that the signal-processing methods that are used for moving objects in high-frequency SAR with the GMTI function are not applicable. For exactly the same reasons, the signal processing of stationary objects in low-frequency SAR is different from that used in high-frequency SAR.

The radar return at low frequencies can be described by a function $f(t, r)$, where the time t parameterises the position of the radar antenna (obtained from the GPS and/or inertial navigation system of the platform) and r is the range from the radar antenna. It should be noted that bearing information is not available in radar data. The radar processing of stationary objects in low-frequency radar data transforms, with backprojection methods, $f(t, r)$ to a two-dimensional SAR image $g(x, p)$ in cylinder co-ordinates x and $p_1$ where x is the azimuth distance along the path and p is the perpendicular distance away from the path. The position is unambiguous if the topography of the ground surface is known except for its mirror image through the flight path. The latter, however, can be distinguished by using the weak, but in this case still sufficient, directive efficiency of the antenna system. The position of the objects is thus obtained as the intersection between a circular cylinder (range cylinder) and two surfaces, one being a semiplane orthogonal with a cylinder axis (azimuth plane) and the other representing the ground surface, see FIG. 1. It is to be noted that a three dimensional reproduction is not possible without knowledge of the topography of the ground surface since there is no information about the third cylinder co-ordinate, the angle in the semiplane orthogonal with the straight path, in radar data. Such a reproduction can be provided by using a plurality of straight paths or a curvilinear flight path according to methods disclosed in Swedish Patent Application 9702331-1 and the corresponding PCT Application SE98/01147, which are herewith incorporated by reference.

In contrast to low-frequency SAR, high-frequency radar data are processed by means of methods which approximate the time variation in $f(t, r)$ and are only applicable to narrow antenna lobes. The methods can be formulated in both the time and/or the Fourier planes. In these methods, especially movements of the platform which deviate from a straight path are corrected approximately by an angle-independent range correction. The latter approximation is applicable within a narrow angular sector and can therefore be applied in the case of a narrow antenna lobe. A similar method is applied also when the antenna lobe is controllable, so-called spotlight SAR. In this case, the range correction varies depending on the direction of the antenna lobe but is equal within the antenna lobe and, thus, approximate. Another common approximation in connection with high-frequency methods is power series development of the time or frequency variation of $f(t, r)$. Typically, series developments are used including the square or cubic term. Also these approximations require a narrow angular sector.

For signal processing of low-frequency radar data, backprojection methods thus have several important advantages over high-frequency methods. On the one hand, general corrections of movements can be introduced into the algorithm, which are at the same time applicable to all angles and all image points. On the other hand, radar raw data are transformed to a SAR image without approximations. Finally, the demand for memory in calculation decreases drastically compared with the methods that are based on Fourier transformation.

Detection of stationary objects in forests using low-frequency SAR requires an optimal geometric resolution to discriminate the objects from the background. This results, of course, in a SAR with a great fractional bandwidth. Apart from achieving the optimal resolution, also the static fluctuations of the background which originate from the speckle effect are reduced. The speckle effect arises when the resolution is much greater than the wavelength (small fractional bandwidth) and contains a plurality of scatterers. The waves backscattered by the scattererers interfere with each other, and the resulting return signal thus is considerably dependent on the observation angle in relation to the resolution cell. Normally the resolution cell contains many independent scatterers, which results in a random amplitude and phase between different resolution cells, so-called speckle.

The detection of moving objects in forests by using low-frequency SAR is based on the fact that the speckle pattern is exactly reproducible if the same measuring geometry is repeated. By arranging the antenna elements in a translation-invariant configuration, all stationary objects, including the stationary background, will satisfy this requirement except for a time delay which corresponds to the mutual distance of the antenna elements divided by the speed of the platform. This means that the speckle pattern is uniform and can be eliminated using a GMTI function. Consequently it is not necessary to have a great fractional bandwidth for detection of moving objects but this can be accomplished by means of a considerably smaller bandwidth. The bandwidth requirement is instead determined by the desired degree of details for the measurements of the objects, i.e. for discrimination of different objects and measurement of their respective positions. It is to be noted that the measuring geometry for the antenna elements is repeated exactly only if the velocity vector of the platform is parallel with the connecting line of the elements, which in practice is not always the case. The method, however, is robust relative to such deviations since the speckle pattern changes only slowly, provided that the bandwidth is sufficient in principle, this means that the antenna elements need not necessarily be configured in a translation-invariant manner but that this is an advantage in order to provide optimum performance of the GMTI function.

For high-frequency SAR, the speckle pattern and, thus, the performance of the GMTI function are influenced by small motions of foliage or branches, for instance caused by the wind. Within a resolution cell the relative geometry and thus the interference between the backscattered waves change. This fact also involves problems of detecting moving objects at low speed since in this case also the background is perceived by the GMTI function as a moving object.

It is desirable to develop low-frequency SAR technique which enables detection of both moving and stationary objects. According to the discussion above, the bandwidth requirements, however, are not as strict for moving objects as for stationary. Since detection of moving objects can be carried out with a smaller bandwidth, the scanning capacity can increase since it is directly proportional to the geometric resolution. On the other hand, a complete measuring of moving objects requires a larger number of antenna elements and, thus, a larger number of signal channels, which reduces the scanning capacity. Thus the problem is the appearance of the signal pattern for a suitable adaptation of the requirements in respect of bandwidth and antenna channels between the modes, see also under item 5 at the end of the specification.

In view of that stated above, it would be great progress if the SAR technique could be improved to allow moving objects to be detected and reproduced by means of a low-frequency SAR radar. In this way, stationary as well as moving objects can be discovered and measured. The object of the invention is to solve this problem, which is achieved by giving the invention the features that appear from the accompanying independent claim. Suitable embodiments of the invention are stated in the remaining claims.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 1:
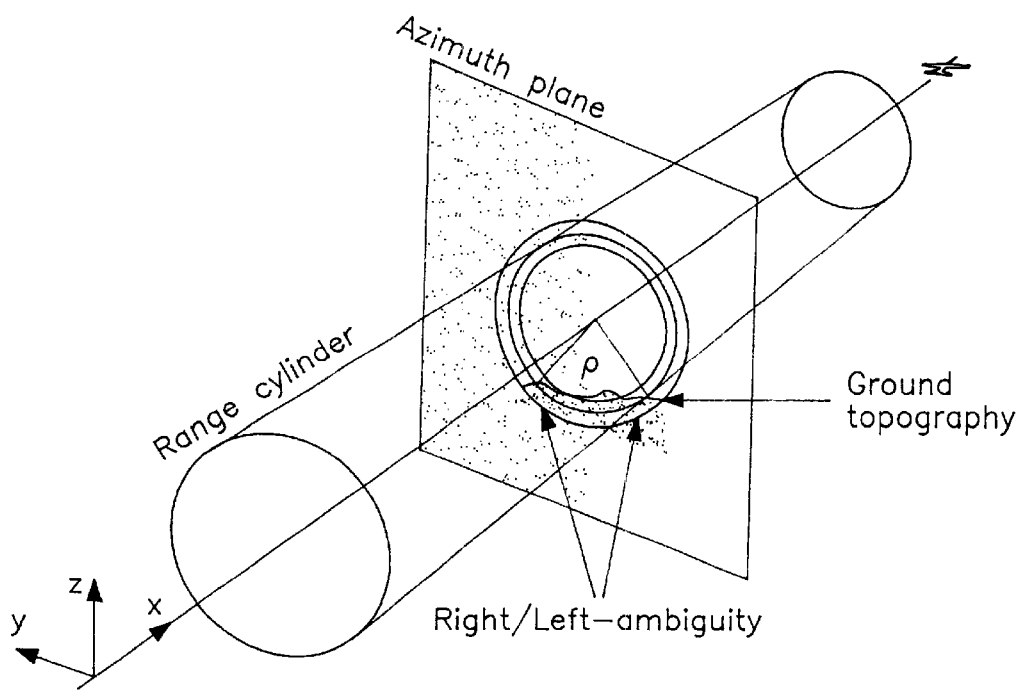
FIG. 1 illustrates the cylinder geometry for SAR measurement of the ground along a straight path.

The principle of the invention comprises four steps: 1) elimination of all stationary objects including the background, 2) detection of moving objects, 3) determination of position and velocity by estimating the bearing of the object and 4) recognition. To achieve simultaneous function in respect of stationary and moving objects, also a fifth step is introduced.

The five steps are described below and are essentially necessary to achieve an optimal radar function. However, depending on specific circumstances, one or more of steps 1, 3, 4 or 5 can be excluded and the method may still produce satisfactory final results. For example, step 1 can be excluded if the stationary background has a low radar cross-section, for example in detection of vessels at sea or ground vehicles on open ground. Sometimes merely detection is sufficient for the radar function, which also eliminates steps 3 and 4 etc.

In a basic embodiment of the invention, it relates to a radar system which comprises a platform moving over a number of objects. The number of objects can be very large and the objects may, for example, appear in the form of a ground surface. The platform supports radar equipment which images the objects by means of synthetic aperture technique (SAR) via at least one antenna, without requirements as to directivity or fractional bandwidth. Moreover the movement of the platform while recording data for a SAR image is essentially rectilinear and uniform.

The invention is mainly characterised in that it comprises a signal-processing device which records received radar echoes from each transmitted radar pulse and records or calculates the position of the used antenna or antennae and which calculates a one-parameter quantity of dimensional SAR images as a function of two image co-ordinates where the parameter is the relative speed. Use is made of the fact that each object, i.e. a radar echo with certain image co-ordinates, is imaged with a maximum ratio of desired to undesired signal for a predetermined value of the relative speed parameter, said value being established to be the magnitude of the relative velocity vector between the object and the platform.

In the calculation the signal-processing device backprojects radar raw data in a hierarchical scheme, where each level is based only on the immediately preceding level, and the summation of radar raw data occurs in the form of subapertures having a gradually increasing length. The calculation is carried out with increments of the relative speed parameter, which decrease essentially quadratically with the length of the subaperture.

Conveniently radar frequencies below 1 GHz are used to achieve the application involving transillumination of vegetation.

For an image consisting of N×N pixels, derived starting from at least N radar pulses and at least N range samples for each radar pulse, preprocessed to a common sample spacing, this can be carried out so that the aperture synthesis processing first occurs with respect to subapertures based on $K_1$ radar pulses, which gives a resolution image with a constant radar amplitude over resolution cells consisting of $N/K_1 \times N$ pixels of the finest resolution that is to be achieved.

Then use is made of the fact that the reflectivity of each resolution cell at low resolution is an $N/K_1$-element-long vector, each vector element being the reflectivity of a subaperture since a plurality of apertures give reflectivity values of the same resolution cell at low resolution, and the vector elements are used as radar data to combine $K_2$ apertures in groups to produce a more finely resolved image with a constant radar amplitude over $N/(K_1 K_2) \times N$ of the pixels of the finest resolution. Finally this process continues iteratively until the finest resolution is achieved.

By linearly combining the signals from at least two antennae on the platform, static objects can be eliminated and moving objects be detected. The elimination of static objects and the detection of moving objects can suitably take place at each level in a generalised hierarchical scheme.

It is also possible to linearly combine the signals from at least two antennae on the platform so that the bearing on moving objects can be determined by means of range differences between SAR images recorded by means of different antennae. The determination of the bearing on moving objects can suitably take place at each level in a generalised hierarchical scheme.

If at least three antennae are used, it is possible to linearly combine at least two for the elimination of static objects and the detection of moving objects and at least two for the determination of the bearing on moving objects. If at least four antennae are used, it is possible to eliminate interference signals by a prior-art method.

Suitably the antennae can be mounted in a translation-invariant and symmetric antenna system in front of or behind the platform. In a suitable concrete embodiment of the antenna system, it comprises 5 broadband radar antennae arranged successively in a boom, the two outermost antennae being transmitting elements and the three inner ones receiving elements.

It is possible to use two antenna systems, one covering the frequency range 200-X MHz and the other X-800 MHz, and 350 MHz<X<550 MHz.

In an advantageous embodiment of the invention, the radar system transmits a pulse sequence divided into at least two frequency steps. Different types of measurement, such as some of the types basic SAR imaging, detection of moving objects, determination of bearing and suppression of interference, are carried out during different frequency steps. The signal processing device optimises, for each frequency step, the number of antenna channels and the resulting allocation of bandwidth per antenna channel on the secondary condition that the Nyquist criterion for sampling of the Doppler signal is maintained, and minimises the number of frequency steps to cover the desired total bandwidth per type of measurement.

After this brief account of embodiments of the invention, it will be described in more detail below under headings associated with the four steps that were stated directly after the list of Figures above.

1) Elimination of Stationary Objects (Clutter Suppression)

Consider a low-frequency radar with only two antenna elements which have exactly the same directional sensitivity but are separated along the velocity vector of the platform relative to the ground. Further assume that the reproduced objects including the background are static. In this ideal situation, the response from the front element will thus be repeated by the rear element after a delay which is given by the separation d divided by the relative speed v, i.e.

$$f_2(t, r) = f_1(t+d/v, r) \quad (1)$$

Figure 2:
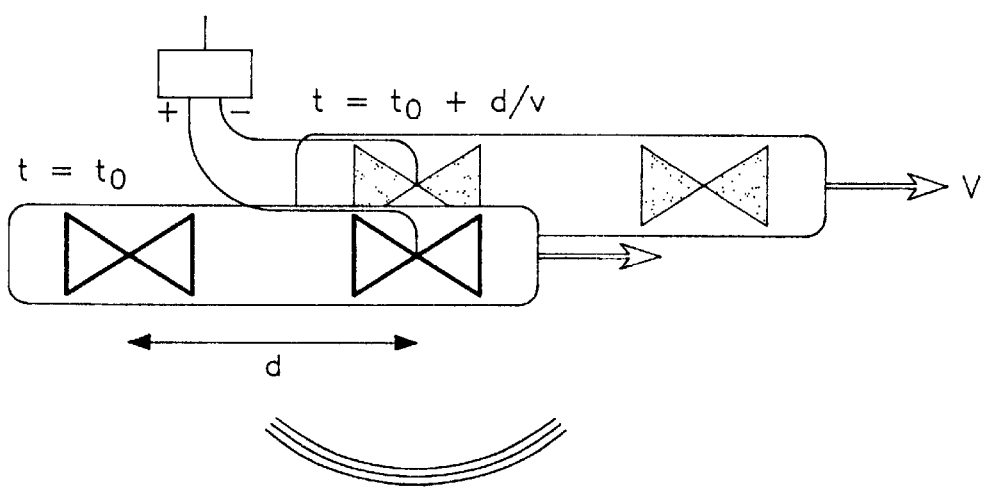
FIG. 2 shows the principle for elimination of static objects in radar data.

By delaying the signal from the front antenna element and subtracting by the signal from the rear, all signals from stationary objects are thus eliminated, see FIG. 2.

This principle of signal cancellation is simple but cannot be directly applied in practice. The reason for this is that the signals from the two antenna elements are not identical but differ from each other for several reasons. First, the velocity vector in most cases deviates from the connecting line between the elements so that the speckle pattern changes. Moreover, irrespective of sudden manoeuvres, the longitudinal axis of the aircraft deviates from the course direction under stable conditions depending on cross winds. Second, the directional sensitivity of the antennae is in practice not identical, which distorts the signals in different ways for different frequencies and directions. Third, the delay (corresponding to the antenna separation) is not guaranteed to be a multiple of the pulse recurrence time, which defines the sample distance for the time t.

For these reasons, at least partial SAR processing of the antenna signals should precede the clutter suppression. In this way, the geometric resolution increases after pulse compression, broadband reconstruction and backprojection, which increases the correlation between the signals since the speckle pattern will be more stable. Furthermore, it is possible to introduce corrections for differences in the directional sensitivity of the antenna elements.

After inversion there are obtained a SAR image from the first element $g_1(x, p)$ and one from the second element $g_2(x, p)$, where x and p are cylinder co-ordinates of the ground and the path of the respective elements is given by $[x_1(t), y_1(t), z_1(t)]$ and $[x_2(t), y_2(t), z_2(t)] = [x_1(t)-d_x, y_1(t)-d_y, z_1(t)-d_z]$, where the antenna separation vector is $\bar{d}=(d_x, d_y, d_z)$. Thus, this case corresponds to the case where the two elements are separated both along and transversely of the nominal straight path. Owing to the separation in the transverse direction, the two elements form the equivalence of an interferometer. The latter has the property that the speckle pattern changes in proportion to the ratio of the angle separation of the elements in the transverse direction seen from the ground to the fractional bandwidth. To maintain a high degree of uniformity, the following relation must be satisfied:

$$\frac{|d_\varphi|}{\rho} \ll \frac{B}{f_o} \tan\theta \quad (2)$$

where $d_0$ is the projection of $\bar{d}$ in the azimuth plane along the p axis, B is the bandwidth, $f_0$ is the centre frequency and $\theta$ is the angle of incidence. This means, for example, that the fractional bandwidth $B/f_0$ should be about 0.01 or greater to tolerate a deviation in the transverse direction of about one meter at a distance of a few kilometres to the ground. It should be observed that, on the other hand, the speckle pattern is not influenced by a separation in the longitudinal direction apart from a translation. Below it is assumed that the fractional bandwidth satisfies the above requirements so that the speckle pattern can be considered identical for stationary objects.

Also moving objects contribute to the SAR images in essentially the same manner, i.e. with a pure translation, provided that they do not accelerate so violently that the velocity vector changes significantly during the delay $d_x/v$. The difference between stationary and moving objects therefore resides only in the translation between the images being different. This is true irrespective of whether the SAR inversion has managed to focus the objects or not since both signals are influenced to the same extent.

As mentioned above, also corrections for differences in directional sensitivity of antenna elements must be introduced. In practice these corrections must therefore be adjusted to direction as well as frequency, which is suitably introduced as part in the SAR inversion when sufficient resolution in direction is achieved. The antenna corrections are of the same type as the corrections for straight path deviations and may therefore be introduced in the SAR inversion using the same principles.

After these corrections, the elimination of stationary objects can take place by subtraction according to $$\epsilon(x,p) = g_2(x,p) - g_1(x+d_x, p+d_p) \quad (3)$$

where $d_x$ and $d_p$ are projections of $\bar{d}$ along the x and p axis, respectively.

The translation between the signals need not be a multiple of the pixel distances in the images. Interpolation of the images with sufficiently great accuracy can take place either in the spatial or in the Fourier plane. In the Fourier plane, this takes place by multiplication by a linear phase function, or in the spatial plane by means of corresponding interpolation coefficients, i.e. a tapered sinc function.

The principles in this paragraph are a generalisation of the DPCA technique for radar systems having a low antenna directivity. They require a stable and calibrated SAR and accomplish only suppression of moving objects. Correspondingly it is possible to generalise the STAP technique for radar systems having a low antenna directivity and thus include other types of signals that are to be suppressed, for instance radio jamming transmitters.

2) Detection of Moving Objects

Generally, detection performance is directly dependent on the signal-noise ratio (SNR) of the radar signal. By means of the clutter suppression, as described above, the SNR of moving objects is significantly improved by the stationary objects being eliminated. This, however, is not sufficient for detection but must be followed by signal integration. A direct application of known methods for SAR inversion, however, does not result in the moving objects being focused in a satisfactory manner. The deteriorated focusing reduces the signal-noise ratio and, thus, also detection performance. The degree of focusing increases with the aperture angle, which results in considerably deteriorated performance in low-frequency SAR. Consequently detection performance is far from the optimal also after the clutter suppression since the signal is spread over a large number of resolution cells. The detection must therefore be preceded by a systematic adaptation of the SAR inversion to various conceivable patterns of movements of the moving objects so that the signal energies will be located (focused) on a minimum of resolution cells and, thus, maximise the signal-noise ratio.

The principles of SAR inversion of stationary objects can be generalised for moving objects as follows. First consider the simplified case with stationary objects on the ground and that the velocity vector $\bar{v}$ of the platform is constant in time. An object having the position $(x_0, p_0)$ in cylinder co-ordinates thus follows in radar raw data $f(t, r)$ a hyperbola given by the range equation $$r = \sqrt{p_0^2 + (vt - x_0)^2} \qquad (4)$$

An exact SAR inversion $g(x, p)$ can therefore, according to the backprojection principle, be obtained from radar raw data $f(t, r)$ by means of the integral transformation.

$$g(x, p) = \int f(t, \sqrt{p^2 + (vt - x)^2}) dt \qquad (5)$$

After the transformation, the SAR image has to be filtered to improve the geometric resolution. The resolution is otherwise deteriorated by distortions in the spectra amplitude of the transmission function caused by, inter alia, the backprojection transformation, the frequency and directional sensitivity of the antenna, and other necessary filter functions. It should be noted that each position $(x_0, p_0)$ has a unique range equation and that the backprojection unambiguously reproduces each such hyperbola as a point in the SAR image. The intensity of the SAR image in each point gives a measure of the probability of an object in this position. As mentioned above, however, a plurality of ground objects may give the same position $(x_0, p_0)$ owing to the ground topography.

The exact SAR inversion can be rewritten so as to apply to variable speed along a straight path. In practice, however, also deviations from a straight path must be processed, which results in corrections for the topography of the ground. The generalisation of equation (5) to this case is given by $$g(x, p) = \int f(t, r(x, p, t)) dt \qquad (6)$$

where $r(x, p, t)$ is the three-dimensional range between antenna position $\bar{r}_a(t)$ at the time t and the position of the ground surface $\bar{r}_g(x, p)$, i.e. $r(x, p, t) = |\bar{r}_a(t) - \bar{r}_g(x, p)|$.

Now assume that radar raw data also contain moving objects. After backprojection, these objects will not focus on a point but give rise to ambiguities in the SAR image. In principle, also moving objects can be focused by means of backprojection if $r(x, p, t)$ is interpreted as the range between the antenna position $\bar{r}_a(t)$ and a moving point on the ground surface, i.e. $r(x, p, t) = |\bar{r}_a(t) - \bar{r}_g(x, p, t)|$.

By performing the SAR inversion for different ground velocities, the moving objects will thus be focused. Nevertheless, their velocity, or bearing, will not be unambiguously determined. It will be realised that this is the case by observing the relative motion in a system of co-ordinates which is fixed in relation to the antenna. Assume that the relative velocity is constant in respect of magnitude and direction. A moving object thus follows a three-parameter hyperbola according to $$r = \sqrt{p_0^2 + [\beta(t - t_0)]^2} \qquad (7)$$

where, $p_0$ identifies the smallest range between antenna and object which occurs at the time $t_0$ and where $\beta$ is the relative speed. It should be noted that the same range equation is also obtained after a rigid rotation about the antenna of the trajectory of the objects which results in ambiguity in bearing. Such a transformation of rotation changes bearing and relative velocity but not relative speed (magnitude of velocity). In a stationary co-ordinate system, however, both speed and ground course of the object are changed. For an identical set of parameters $(t_0, p_0, \beta)$, there is thus a one-parameter set of moving objects with varying ground speed and ground course.

Observe, for instance, an object moving slowly in parallel with the straight path. In the system of co-ordinates fixed to the antenna the object thus moves rearwards at a speed dose to that of the platform. Another moving object which moves at the same speed in the system of co-ordinates fixed to the antenna, although perpendicular to the straight path, thus follows the same range equation. In the system of co-ordinates fixed on the ground, however, this object moves at a higher speed and at an angle of 45° from the straight path. These two objects have significantly different patterns of movements in the system of co-ordinates fixed on the ground but are perceived in the system of co-ordinates fixed to the antenna, and thus in radar raw data, to be identical and therefore cannot be discriminated by measuring merely the function f(t, r).

The details of the bearing ambiguity and how it can be resolved will be discussed later on. At the moment it is sufficient to establish that in the case of constant relative velocity each range history corresponds to a one-parameter set of objects having different ground velocities. Each such set is characterised in that the minimum range $p_0$ is observed with an unknown bearing since the directivity of the antenna is missing, and thus an unknown ground velocity. As a result, there is for each object having a constant ground velocity and an arbitrary ground course a corresponding linear motion with a given ground course which gives exactly the same range history.

It may thus be concluded that SAR focusing of moving objects at an arbitrary ground velocity, i.e. ground speed and ground course, can be obtained merely by adjusting the parameter of the relative speed β. This means that the entire SAR image is focused for a moving object at a given ground velocity, which results in the entire set of bearing-ambiguous objects being focused at the same time. By varying the relative speed, all moving objects are then focused. After the three-parameter SAR processing follows detection, i.e. small surroundings of each picture element in the SAR images are analysed to investigate whether the detection criterion is satisfied. In this case, known principles for detecting a signal in surrounding noise, e.g. CFAR (constant false alarm ratio) or the like, can be used.

The clutter suppression can in principle be carried out at different stages during the processing. In practice, a minimum resolution, however, is required so that compensations for direction and frequency sensitivity can be included. Generally, SAR focusing is translation-invariant, i.e. shift-invariant in time t, which means that the objects in the two images are separated in proportion to the relative velocity. The stationary objects can thus be eliminated after a delay which corresponds to the separation between the antenna elements, and subtraction. The moving objects, however, are not eliminated provided that the corresponding displacement is of wavelength size or more. If the relative velocity is sufficiently high, i.e. higher than the geometric resolution, a moving object may give rise to two separated objects after the subtraction. In the subsequent processing, this separation can be eliminated to maximise the signal-noise ratio.

For the above-mentioned method of detection to function, the SAR processing must be carried out for all conceivable and reasonable relative speeds. The resolution in relative speed $\Delta\beta$ must thus be sufficiently high so that a moving object is integrated in phase during the entire integration time $T_i$. The requirement as to relative errors for the focusing parameter, $\Delta\beta/\beta$, is inversely proportional to the time-bandwidth product, which gives $$\Delta\beta \leq \frac{\lambda\rho}{4\beta T_i^2} \quad (8)$$

Given typical values of quantities included—wavelength 1 m, range 10 km, speed 100 m/s and integration time 5 s, $\Delta\beta<1$ m/s is obtained. Since conceivable relative speeds may vary within a considerably greater range, e.g. ±30 m/s, the number of speed classes can be very large and the three-parameter SAR focusing must thus be computationally efficient.

The above description of the SAR focusing implies that the antenna elements move along a straight path, which in practice never is the case. The deviation from the straight path breaks in principle the bearing ambiguity even if the sensitivity is insufficient to determine the bearing with acceptable accuracy. This means instead that corrections for straight path deviations must be introduced in the SAR focusing. This means that radar raw data must be refocused for different ground courses in addition to the above-mentioned relative speed. The requirement as to resolution in bearing is directly proportional to the deviation from a straight path and thus increases with the utilised aperture distance, i.e. the integration time.

To accomplish the method for SAR focusing, i.e. to make it computationally feasible, it is necessary to introduce a hierarchical scheme for division of the backprojection integral into subtotals, i.e. successively increasing subapertures and successively decreasing subimages. The division into subtotals is based on the principle that the degree of approximation can, by means of the scheme, be kept constant over the entire SAR image. The summation over a subaperture thus is exact along a beam through the centre of the subimage at issue. For positions within the subimage which deviate from this line, a range error is introduced which is in the order of b/2 sin$\gamma$ where $\gamma$ is the angular deviation from the centre line and b is the length of the subaperture. The maximum range error within a subimage of the size a therefore is $$\Delta r \approx \frac{ab}{\sqrt{(4r)^2 + b^2}} \quad (9)$$

where r is the range between the subaperture and the subimage. For each level in the hierarchical scheme, the length of the subaperture increases by a certain factor, and the subimages must thus be decreased by a corresponding factor for the range error to remain on the same level.

Figure 3:
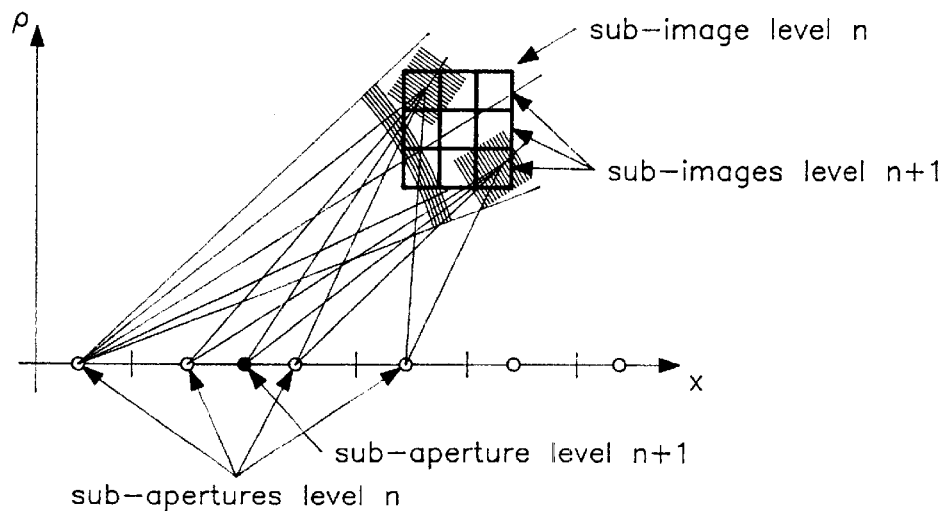
FIG. 3 shows the principle of factorised backprojection.

A direct application of equation (6), without division into subtotals and subimages, means that the number of operations is $O(N^3K)$ given an N×N image, N data dots along the path and K speed classes. A hierarchical scheme on the other hand requires only $O(N^3K/g)$ where $\epsilon(n,N)$ is the relative calculation profit according to $$\epsilon(n,N) \approx N^{1-1/n} \quad (10)$$

and n is the number of levels in the scheme. For e.g. N=4098 and n=6$\epsilon$~$10^3$. In this example, L=4 subapertures are combined between each level according to FIG. 3. After 6 levels, the full aperture length ($L^6$=4096) and the desired image resolution are achieved. The resolution increases by a factor of 4×4 on each level. The number of speed classes is on the last level K and these decrease quadratically according to equation (8) on each level compared with the length of the subaperture. In practice, this means that the calculation burden is completely dominated by the last stage, where the number of operations over all speed classes is $O(N^{2+1/n}K)$, which directly gives equation (10).

The scheme can also be formulated to handle straight path deviations when the cylinder or bearing symmetry is broken. This corresponds to the case where a range error arises owing to the fact that the signal from the object originates from another range than the assumed one, which must be compensated for. In the hierarchical scheme, a correction is made for each subaperture summation. This corrects for straight path deviations in a three-parameter SAR focusing, but neglects the broken symmetry with respect of bearing. This means in principle that the SAR focusing will be four-parametric, in which also the ground course must be considered. In the hierarchical scheme, the straight path deviations are small on the initial levels and can effectively be neglected. On the last levels, however, it may be necessary to introduce a number of bearing classes to prevent defocusing.

The hierarchical scheme for SAR focusing will now be described mathematically. Consider a SAR which reproduces both stationary and moving objects on the ground. Calculating a subaperture on level n means that radar data are transformed according to $$f_{n,m,p}(t, r) = \int f_{n-1,m,p}(t',r')dt' \quad (11)$$

where, on the level n, t is the point of time for the centre of the subaperture m and speed class p, t' are the points of time for the subapertures on level n-1, and the summation takes place over $C=[t-\Delta t/2L^n, t+\Delta t/2L^n]$. r and r' are the range along a line from the centre of each subaperture to the centre of each subimage, i.e.

$$r = r(x, p, t) = |\bar{r}_a(t) - \bar{r}_g(x+ut,p)| \quad (12)$$

$$r' = r(x,p,t') = |\bar{r}_a(t') - \bar{r}_g(x+ut',p)| \quad (13)$$

The number of numerical operations thus is (number of subapertures)×(number of subimages)×(number of time positions in the subaperture sum)×(number of range points in the subimage)×(number of speed ranges). On the first level, $f_{0,m,p}(t, r) = f(t, r)$ i.e. radar raw data, is set and then the scheme continues until the number of subimages for a certain subaperture has become equal to the desired image size, In this way, the scheme can be interrupted when the SAR image has a suitable resolution.

3) Position and Velocity Determination

The third step of the measuring principle is to resolve the abovementioned bearing ambiguity. After SAR inversion and clutter suppression, objects are detected with a maximum signal-noise ratio but with unknown bearing. We are now going to determine both bearing and range to unambiguously position the object and correctly reproduce it in relation to the SAR image of the stationary objects.

The bearing can be determined by interrupting the rotational symmetry that arises when one aperture is used. The same ambiguity arises if two apertures are used to provide clutter suppression. At least one more aperture is thus necessary for the estimation of the bearing.

The combination of SAR inversion and clutter suppression results in an advantageous signal-noise ratio for accurate estimation of the bearing. For example, with a wavelength of 1 m and a signal-noise ratio of 30 dB the range error is given by $$\delta\rho = \frac{\lambda}{2\pi\sqrt{SNR}} \approx 0.5 \text{ cm} \quad (14)$$

A typical value of the separation of the antenna apertures is 2 m, which gives a positioning error in the order of 20 m at range of 10 km. This inaccuracy is in principle limiting to the positioning. It should be noted, however, that the measuring principle is a multistage process, which means that the partial step with the maximum source of error dominates. Positioning performance thus is directly dependent on how the SAR inversion and the clutter suppression have succeeded.

Figure 4:
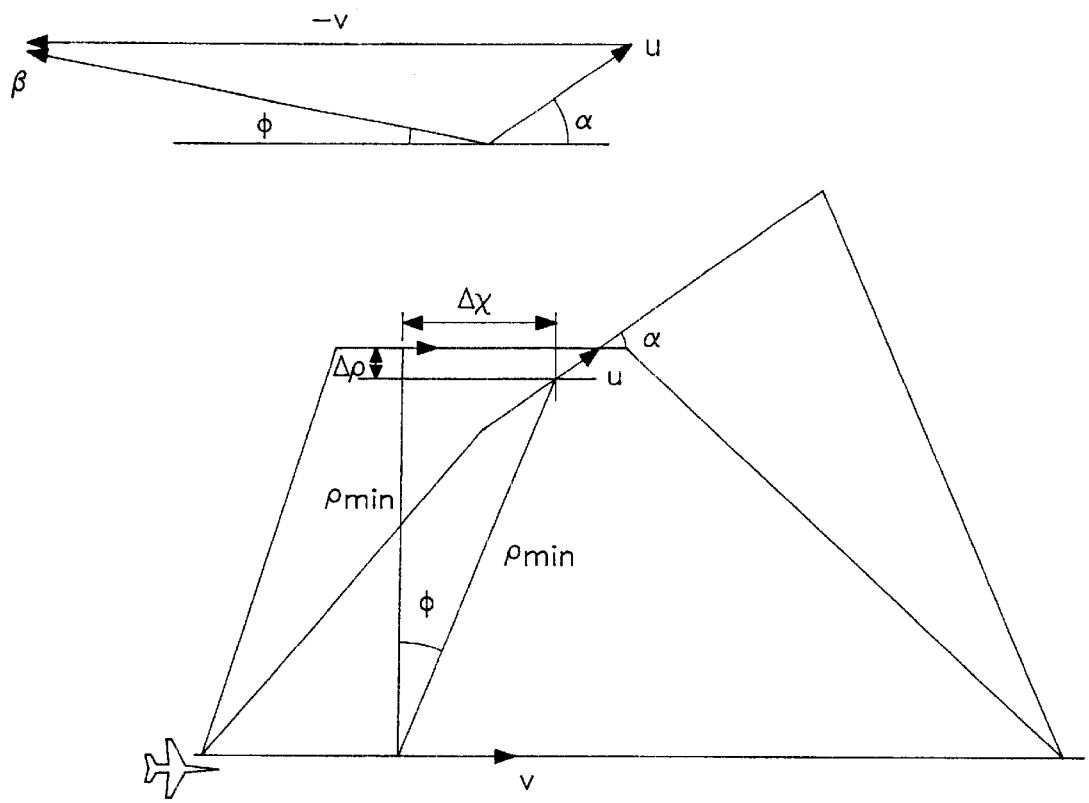
FIG. 4 shows bearing ambiguity for SAR measurement of two moving objects which follow exactly the same range equation but different ground speed and course.

Now consider two moving objects which move in a system of co-ordinates fixed on the ground according to FIG. 4. The trajectories are selected so that the range between the antenna and each object is described by exactly the same range equation r(f). The three parameters $(t_0, p_0, \beta)$, i.e. minimum range, point of time for minimum range and relative speed, are thus identical. Still, the trajectories of the objects are different, The different trajectories can be parameterised on the basis of the bearing θ or alternatively ground course α. The one-parametric multitude of trajectories with different ground speed u but with the same relative speed relative to the antenna $\beta_0$ is thus given by $$u = v \cos \alpha \pm \sqrt{\beta_0^2 - (v \sin \alpha)^2} \quad (15)$$

or expressed in the bearing $$u = \sqrt{\beta_0^2 + v^2 - 2\beta_0 v \cos\theta} \quad (16)$$

At a certain point of time, the trajectory of the moving object will thus deviate from the detected position after SAR inversion and clutter suppression. By measuring the bearing θ by the difference in range according to the above-described method, the position and ground velocity of the object can be unambiguously determined at the time t. The deviation from the detected position at different points of time is thus given by $$\Delta x = p_0 \sin\theta + (v - \beta_0 \cos\theta)(t - t_0) \quad (17)$$

$$\Delta p = p_0(\cos\theta - 1) + \beta_0 \sin\theta(t - t_0) \quad (18)$$

4) Recognition

The fourth and final step of the measuring principle uses the three previous steps for generating a SAR image of the moving object with a maximum resolution. By means of known methods for recognition, for example using Bayesian feature classification, the object can then be identified.

The basic problem in this step is to estimate the true trajectory and changes in attitude of the object. Since the integration time to provide a maximum resolution typically is hundreds of seconds, the method must also be able to handle curvilinear trajectories. Theoretically, it would be possible to design a method for SAR inversion which examines all possible curvilinear trajectories and then detects the true one on the basis of an optimality criterion. Mathematically and physically, this way of attacking, however, encounters problems since the sample space for the conceivable trajectories increases exponentially with the integration time. It will thus be impossible to handle the problem owing to uncontrollable growth of noise and calculation burden.

Instead a method is suggested, which is based on dividing the pattern of movements into trajectories which are linear in pieces and which are detected by means of the previously described methods. The maximum integration time for the SAR inversion is thus limited by the dynamic properties of the object For a ground vehicle the integration time is typically a few seconds at dm/m wavelengths.

Subapertures up to a length of a few seconds can thus be used for the detection and the estimation of the bearing. For each such subaperture, the trajectory is estimated by speed and course. By associating detections for different subapertures, the trajectory can thus be determined and a SAR image with full resolution can be generated. Also the accuracy in the estimation of the bearing is improved by following a complete trajectory.

5) Division of Instantaneous Bandwidth

SAR systems are in practice limited as to bandwidth. This means that it is most important to use the available bandwidth for prioritised radar functions. According to the present invention, the above-mentioned different steps require varying bandwidth and different numbers of antenna channels. This can be utilised for optimising the system in each given situation.

The optimisation is carried out by using the principle of stepped frequency, i.e. by dividing the pulse sequence into a number of frequency steps. In each frequency subband, the available instantaneous bandwidth can then be divided over a varying number of antenna channels. The more antenna channels the more degrees of freedom for sophisticated radar functions, but the smaller bandwidth per channel and, thus, the more frequency steps to cover the given subband. Each subband can be optimised independently of the others on the secondary condition that the Nyquist criterion for sampling of the Doppler signal is maintained. The latter can be based on periodic sampling, or aperiodic sampling according to Swedish Patent Application 9601199-4 and the corresponding PCT Application SE97/00543, which are herewith incorporated by reference.

For the basic SAR mode, only one antenna channel is necessary, but on the other hand the maximally available total bandwidth to overcome the background clutter by signal integration. For the GMTI mode with position measurement at least three antenna channels, but smaller bandwidth, are necessary since the background clutter is also suppressed by channel subtraction. Interference suppression, finally, requires additional antenna channels, but the bandwidth can be concentrated on merely subbands where interference is discovered. By means of the method with stepped frequency, the system can in a natural way be optimised for a given task.

What is claimed is:

1. A radar system comprising a platform which moves over a number, which can be very large, of objects, e.g. in the form of a ground surface, and supports radar equipment which reproduces the objects by means of synthetic aperture technique (SAR) via at least one antenna without requirements as to directivity or fractional bandwidth, the movement of the platform, during the recording of data for a SAR image, being essentially rectilinear and uniform, characterised in that it comprises a signal-processing device which records received radar echoes from each transmitted radar pulse and records or calculates the position of the used antenna or antennae and calculates a one-parameter quantity of two-dimensional SAR images as a function of two image co-ordinates where the parameter is the relative speed, use being made of the fact that each object, i.e. a radar echo with certain image co-ordinates, is reproduced with a maximum ratio of desired to undesired signal for a predetermined value of the relative speed parameter, said value being established to be the magnitude of the relative velocity vector between the object and the platform and, where the signal-processing device, in connection with the calculation, backprojects radar raw data in a hierarchical scheme, where each level is based only on the immediately preceding level, and where the summation of radar raw data occurs in the form of subapertures having a gradually increasing length.

2. A radar system as claimed in claim 1, characterised in that the calculation occurs with increments of the relative speed parameter, which decease essentially quadratically with the length of the subaperture.

3. A radar system as claimed in claim 2, characterised in that for an image consisting of N×N pixels, derived starting from at least N radar pulses and at least N range samples for each radar pulse, preprocessed to a common sample spacing, the aperture synthesis processing first occurs with respect to subapertures based on $K_1$ radar pulses, which gives a low-resolution image with a constant radar amplitude over resolution calls consisting of $N/K_1 \times N$ pixels of the finest resolution that is intended to be achieved, use then being made of the fact that the reflectivity of each resolution cell at low resolution is an $N/K_1$-element-long vector, where each vector element is the reflectivity of a subaparture since a plurality of apertures give reflectivity values for the same resolution cell at low resolution, and use is made of the vector elements as radar data to combine $K_2$ apertures in groups to produce a more finely resolved image with a constant radar amplitude over $N/(K_1 K_2) \times N$ pixels of the finest resolution, whereupon this process continues iteratively until the finest resolution is achieved.

4. A radar system as claimed in claim 1, characterised in that it uses radar frequencies below 1 GHz.

5. A radar system as claimed in claim 1, characterised in that it linearly combines the signals from at least two antennae on the platform so that static objects are eliminated and moving ones are detected.

6. A radar system as claimed claim 5, characterised in that the signal-processing device in the calculation backwardly projects radar raw data in a generalised hierarchical scheme where the elimination of static objects and the detection of moving objects occur on each level.

7. A radar system as claimed in claim 5, characterised in that it uses at least three antennae on the platform and linearly combines the signals from at least two of the antennae, so that the bearing on moving objects can be determined by means of range differences between SAR images recorded with different antennae.

8. A radar system as claimed in claim 7, characterised in that it uses at least four antennae on the platform and eliminates interference signals using a known method.

9. A radar system as claimed in claim 1, characterised in that it linearly combines the signals from at least two antennae on the platform so that the bearing on moving objects can be determined by means of range differences between SAR images from different antennae.

10. A radar system as claimed in claim 9, characterised in that the signal-processing device in the calculation backwardly projects radar raw data in a generalised hierarchical scheme where the bearing on moving objects is determined on each level.

11. A radar system as claimed in claim 5, characterised in that it transmits a pulse sequence which is divided into at least two frequency steps, that it carries out different types of measuring, such as some of the types basic SAR imaging, detection of moving objects, determination of bearing and suppression of interference, during different frequency steps and optimises, for each frequency step, the number of antenna channels and the resulting allocation of bandwidth per antenna channel on the secondary condition that the Nyquist criterion for sampling of the Doppler signal is maintained, and minimises the number of frequency steps.

12. A radar system as claimed in claim 1, characterised in that the antennae are mounted in a translation-invariant and symmetric antenna system in front of or behind the platform.

13. A radar system as claimed in claim 12, characterised in that the antenna system comprises 5 broadband radar antennae arranged successively in a boom, the two outermost antennae being transmitting elements and the three inner ones receiving elements.

14. A radar system as claimed in claim 12, characterised in that it uses two antenna systems, one covering the frequency range 200-X MHz and the other X-800 MHz, and 350 MHz<X<550 MHz.

* * * * *